May 26, 1959   R. WARNECKE ET AL   2,888,595
TRAVELLING WAVE DELAY TUBES OF THE MAGNETRON TYPE
Filed March 11, 1952   4 Sheets-Sheet 1
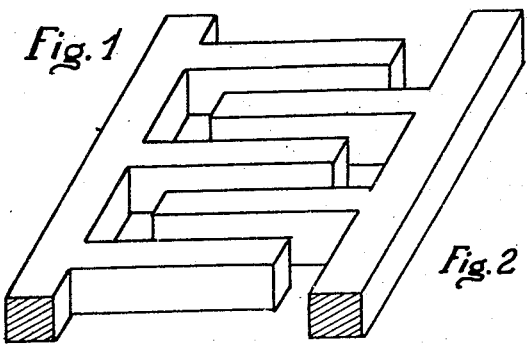
Fig.1
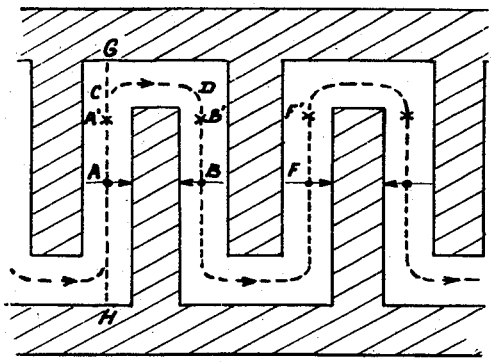
Fig.2
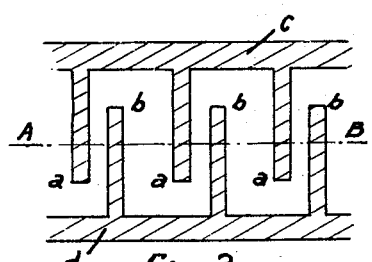
Fig.3a
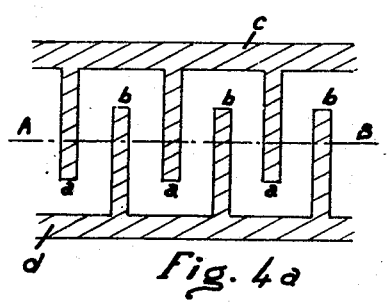
Fig.4a
Fig.3b
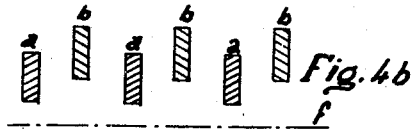
Fig.4b
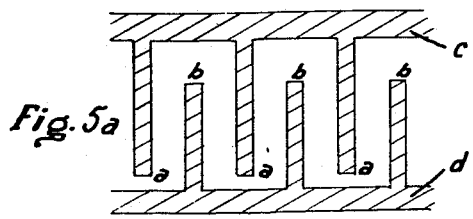
Fig.5a
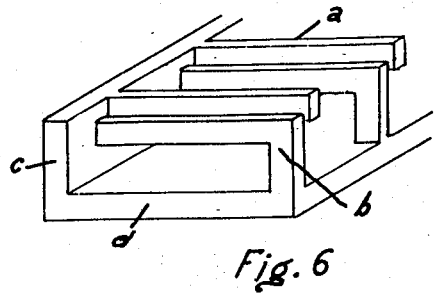
Fig.6
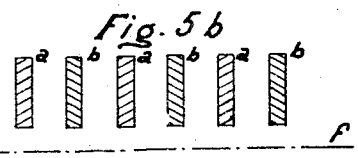
Fig.5b
INVENTORS
ROBERT WARNECKE
PIERRE GUENARD
By
Hazeltine, Lake & Co.
AGENTS May 26, 1959 R. WARNECKE ET AL 2,888,595
TRAVELLING WAVE DELAY TUBES OF THE MAGNETRON TYPE
Filed March 11, 1952 4 Sheets-Sheet 2
*Fig. 7a*
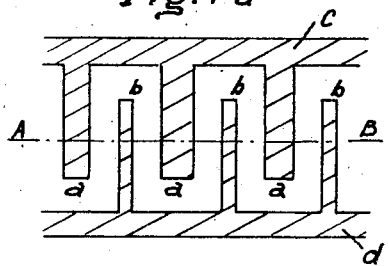
*Fig. 8a*
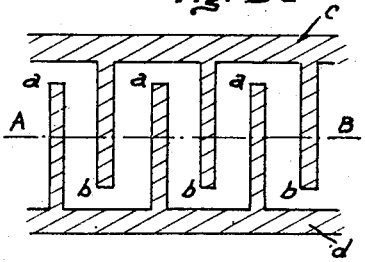
*Fig. 7b*
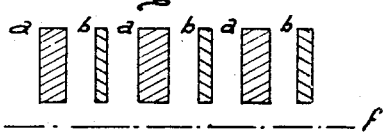
*Fig. 8b*
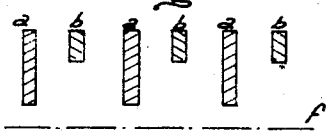
*Fig. 9*
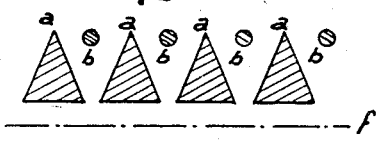
*Fig. 10*
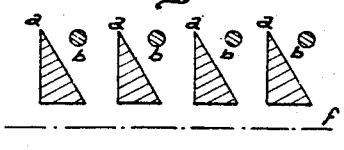
*Fig. 11*
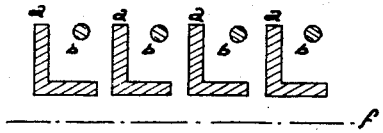
*Fig. 12*
*Fig. 13*
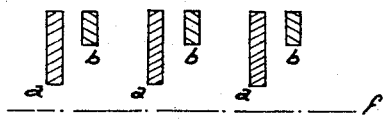
*Fig. 14*
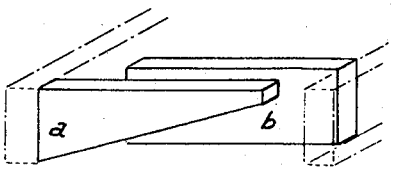
INVENTORS
ROBERT WARNECKE
PIERRE GUENARD
BY:
Haseltine, Lake - Co.
AGENTS May 26, 1959     R. WARNECKE ET AL     2,888,595
TRAVELLING WAVE DELAY TUBES OF THE MAGNETRON TYPE
Filed March 11, 1952     4 Sheets-Sheet 3

INVENTORS
ROBERT WARNECKE
PIERRE GUENARD
By:
Haseltine, Lake & Co.
AGENTS

United States Patent Office 2,888,595
Patented May 26, 1959

2,888,595
TRAVELLING WAVE DELAY TUBES OF THE MAGNETRON TYPE

Robert Warnecke and Pierre Guenard, Paris, France, assignors to Compagnie Generale de Telegraphie Sans Fil, a corporation of France Application March 11, 1952, Serial No. 275,928

Claims priority, application France March 15, 1951

19 Claims. (Cl. 315—3.5)

The present invention relates to delay circuits for travelling wave tubes and the like.

Before describing the object of the present invention, which aims to improve the delay circuits of travelling wave tubes, and more particularly of travelling wave tubes of the magnetron type, known from U.S. Patent No. 2,511,407 of W. Kleen et al., it is useful to recall the conditions to which, as much as possible, these circuits should respond.

From the point of view of their high frequency characteristics, the delay lines should satisfy the following conditions:

(1) To have a determined rate of delay (the rate of delay being the ratio of the velocity of light to the phase velocity of the wave used, the latter nearing the velocity to which the electrons are driven in the crossed electric and magnetic fields to which action they are subjected). This delay rate depends at the same time upon the voltage applied to the delay line with respect to the cathode, and upon the tube efficiency.

(2) To have a dispersion (variation of the phase velocity with the frequency) inferior to a limit defined by the band-pass which it is desired to obtain from the tube.

(3) To have a high coupling resistance, for the wave in interaction with the electrons, i.e., to have a longitudinal component of the electric field as great as possible, at the level of the electronic beam, for a given power injected in the line.

(4) Not to have a mode of propagation for frequencies situated outside of the utilised range, which have the same phase velocity as the wave used, and an important coupling resistance, a circumstance which might give rise to oscillations at an undesired frequency.

(5) To have a weak proper attenuation, so as not to reduce the circuit efficiency.

(6) To have a form which might eventually give rise to the introduction of an important attenuation on a small fraction of its length so as to prevent the risks of parasitic oscillation owing to a wrong matching of both ends of the line, without either reducing the efficiency nor practically reducing the gain.

The geometrical form of the line should allow the interaction of a wave propagating therein with an electronic beam travelling in crossed electric and magnetic fields. This generally imposes the following condition on the delay line:

(7) To present a plane face towards the beam, when this beam is rectilinear, or a face shaped as a circular cylinder whose axis is perpendicular to the direction of travel, when the beam itself is in the form of a cylinder, whose axis is said axis.

In the following, only plane structures will be described.

However, it should be understood that the object of the invention is extended to the lines obtained from these plane structures by rolling them into a cylinder whose axis is perpendicular to the direction of travel.

From a technologic point of view, the line conditions which it is desirable to obtain are the following:

(8) To have a geometrical form permitting an embodiment which is mechanically accurate and easy to manufacture, and whose accuracy is not substantially decreased by the thermic treatments involved in the course of the tube manufacture or by the effect of the rise of temperature due to the electronic bombardment during high frequency operation.

(9) To be capable of a thermic dissipation limiting this rise to temperature to an acceptable value, as well from the point view of vacuum technics, as from that of geometric constancy of the line.

(10) Not to need the introduction of solid dielectrics in close proximity to the circuit or in contact therewith, because, should their surface get stained, these dielectrics could happen to modify the line properties, and particularly its attenuation, without possibility of control. If, moreover, this dielectric separates from each other parts which are at different D.C. potentials, it may give rise to bad insulation and risks of discharge.

The delay circuits in the shape of a flat helix such as are described in the aforesaid U.S. Patent No. 2,511,407, conveniently satisfy the conditions 1 to 7, but they show many disadvantages in reference to conditions 8 to 10, particularly in the case of tubes of relatively high power.

The invention will be better understood with reference to the accompanying drawing, in which:

Figure 1 shows an interdigital delay line of the known type;

Figure 2 shows in longitudinal section a portion of said line;

Figures 3 to 16 show various embodiments of lines according to the invention;

Figure 15:
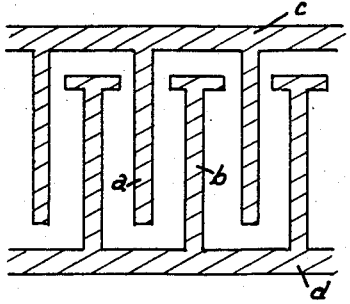

The known delay line of the interdigital form; that is to say, constituted, as shown in Figure 1, of two identical combs symmetrically imbricated, possesses convenient technologic characteristics, if its fingers are sufficiently big and short. Indeed, it is then quite possible to embody it with a good geometrical accuracy. Besides, without any appreciable modification of the line properties, the finger supports can be joined to the same metallic mass which, for example, may be a part of the tube vacuum enclosure. This, on the one hand, avoids the need to support the line by means of dielectric elements and, on the other hand, allows easy dissipation of the thermic energy resulting from the electronic bombardment of the line fingers. However, if this line is symmetrical, it will have a disadvantage which will appear from the following analysis.

The structure of the waves which progress in the interaction space, that is to say, outside of the line and near the middle plane of the space, is essentially determined by the phase difference $\psi A - \psi B$ which the fields present in two points such as A and B of the middle plane (Figure 2), situated in two consecutive interdigital spaces. Assuming $\psi$ to represent this phase difference value which is found between $-\pi$ and $+\pi$, the phase velocity of the most rapid wave is given by the expression:

$$v = \frac{\omega p}{\psi}$$

where $\omega$ represents the pulsation of the wave progressing along the line, and $p$ the distance AB. A positive value of $v$ corresponds to waves progressing in the same direction as the high frequency energy which travels over the line, as negative value to a wave progressing in inverse direction with regard to the energy. Besides this fundamental wave, slower waves or space harmonics exist, whose phase velocity is given by the expression:

$$v = \frac{\omega p}{\psi + 2\pi m}$$

where $m$ is a positive or negative whole number. The phase angle $\psi$ can be given a value by considering the interdigital line as being a folded Lecher line. This phase difference is due to the travelling time along the element A C D B of the Lecher line, and also to the phase inversion due to the fact that an observer placed in the middle plane of the line moves, when going from A to B, successively in contrary fields, as shown by the respective arrows passing by A and B. Therefore we have:

$$\psi = \frac{2\pi l}{\lambda} - \pi$$

$l$ designating the length A C D B, that is to say practically the width of the line measured between the points G and H. When this width is inferior to $\lambda/2$ (a favourable circumstance for fulfilling the conditions 8 and 9) $\psi$ is negative and the fundamental wave then corresponds to a travel in a direction inverse to that of the energy, and the amplification cannot be obtained except for interaction by using the space harmonic corresponding to $m=1$ which is the most rapid among the waves progressing in the same direction as the energy. Now, in the tubes of that type, it is of particular interest to use the fundamental wave for interaction, as it is more rapid than the space harmonics, and carries the greatest quantity of energy.

However, it should be noted that these considerations are of value only quite close to the middle plane. In a plane such as A′ B′ F′ (Figure 2), the fields find again the same distribution, except for the pase, only after a travel equal to A′ F′, that is to 2p. The phase difference between A′ and F′ being clearly equal to $$\frac{4\pi l}{\lambda}$$

outside of the middle plane therefore, waves are found whose phase velocities are defined by:

$$v_n = \frac{2p\omega}{\frac{4\pi l}{\lambda} + 2n\pi} = \frac{\omega p}{\frac{2\pi l}{\lambda} + n\pi}$$

where $n$ is a positive or negative whole number. It shows that if $l$ is inferior to $\lambda/4$, $v_n$ is positive for $n=0$. Outside of the symmetry plane, therefore, a fundamental wave exists which corresponds to $n=0$ and progresses in the same direction as the energy.

This analysis shows that, in the line, there are two types of waves, symmetrical waves corresponding to the even values of $n(n=2m)$ which exist alone, in the line middle plane and whose amplitude is not null, and asymmetrical waves, corresponding to odd values of $n$ and whose amplitude is null in the middle plane of the line.

When the width of the line is inferior to a value close to $\lambda/2$, the fundamental symmetrical wave progresses in a direction inverse from that of the energy. When the width is inferior to about $\lambda/4$, the fundamental wave is an asymmetrical wave of direct or same direction as the energy. The amplitude of this wave being null in the middle plane, that is to say, mainly in the region where the electronic beam passes, this wave shows a small coupling resistance, whereby the condition (3) is not satisfied.

The object of the present invention is to indicate means allowing an increase of the coupling resistance of that wave at the expense of the symmetrical fundamental wave. These means are embodied by the introduction of a dissymmetry in the line structure which destroys the symmetry of the wave field with respect to the middle plane, and in this plane wave will appear whose amplitude was null in the symmetrical line. According to the invention, this dissymmetry may be embodied by the use of one of the following means, separately or in combination:

(1) Displacement of both combs with regard to each other, parallel with the direction of travel.

(2) Displacement of both combs perpendicularly to their plane.

(3) Use of two combs whose fingers have different lengths.

(4) Use of two combs whose fingers have different sections.

The drawings show examples of asymmetrical interdigital lines according to the invention. The Fgures 3a and 3b represent a line including two identical combs displaced in the direction of travel, the Figure 3b being a section along A B of the Figure 3a. The Figures 4a and 4b, in the same way, show a line including two identical combs displaced perpendicularly to their plane.

The Figures 5a and 5b represent a line including combs provided with fingers of different lengths, the Figure 6 a variant of the same line, characterized by a reduced transverse bulk, this being obtained by folding the fingers $b$ of one the combs at right angle and fixing them to a support $d$ perpendicular to the support $c$ of the fingers $a$, and forming both supports as a single block.

The Figures 7a and 7b represent a line including fingers of different sections. The Figures 8a and 8b represent a line including fingers of different sections displaced perpendicularly to the line plane. The Figures 9, 10, 11 and 12 represent variants of the same device in which one of the combs include fingers constituted by rods of circular section, the other comb including fingers whose section is shaped as isosceles triangles (Figure 9), as right-angle triangles (Figure 10), as L (Figure 11), or as T (Figure 12). In every figure, the axis of the beam progressing parallel to the line, has been designated by $f$.

In order to keep the undesired modes away (condition 4), it is advantageous, according to the invention, to use fingers which are at the same time, of different sections, displaced perpendicularly to the line and of different lengths.

This advantage will be explained with the help of the graph of Figure 17 which shows the rate of delay $c/v$ ($c$ being the velocity of light and $v$ the phase velocity of the wave of length $\lambda$) in relation to $\lambda$, for the fundamental wave travelling in a line whose section is represented in Figure 10 for the cases:

(a) Of fingers of equal length, (b) of fingers of unequal length. It shows that in the case (a) this curve (called dispersion curve) is composed of two branches joining each other again at point 0; therefore, for the same velocity $v$, there always exist two points such as M and N corresponding to two distinct wave lengths $\lambda_1$ and $\lambda_2$; and therefore there is a possibility of undesired oscillation on the wave $\lambda_2$ besides the amplification of the desired wave $\lambda_1$.

Figure 17:
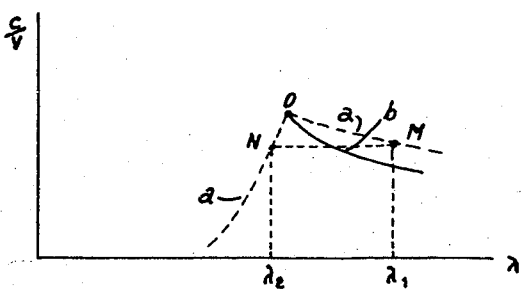
Figure 17 shows a dispersion curve of said lines.

In the case (b), on the contrary, according to the experiments of the applicants, the dispersion curve shown in full line in Figure 17 is reduced to only one branch, and the condition (4) is satisfied.

In the arrangements including displacement of the combs perpendicularly to the line, for which examples are supplied by the Figures 4 and 8 to 12, one of the combs does not receive any electrons from the beam, and it is possible to reduce its section as shown in the Figures 9 to 12, without there being any rise of temperature in these fingers. The fact that these elements are relatively far from the electronic beam makes it easy to introduce an attenuation by constituting a number of these fingers of a material having a great high frequency resistance, and particularly of a magnetic material, such as kovar, for example, the use of which is convenient with vacuum technics.

The structure schematically represented by the Figure 3 can be advantageously combined with the line structures represented by the Figures 8 to 12 as shown by the Figure 13, for the first one of these structures.

Figure 16:
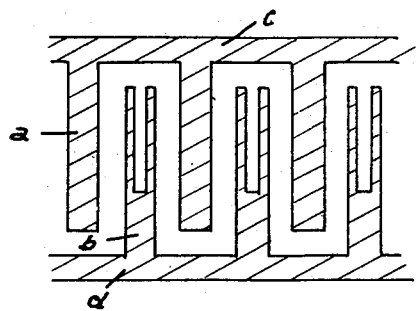

In the preceding figures, it has been supposed that the fingers had the same section all along their length. It may be advantageous to use fingers not satisfying this condition as shown in the Figure 14, in which one of the combs is provided with fingers whose section increases from its end to its support, the Figure 15 in which one of the combs includes fingers ended by a plate and the Figure 16 in which one of the combs includes fingers provided with a lengthwise groove.

Figure 18:
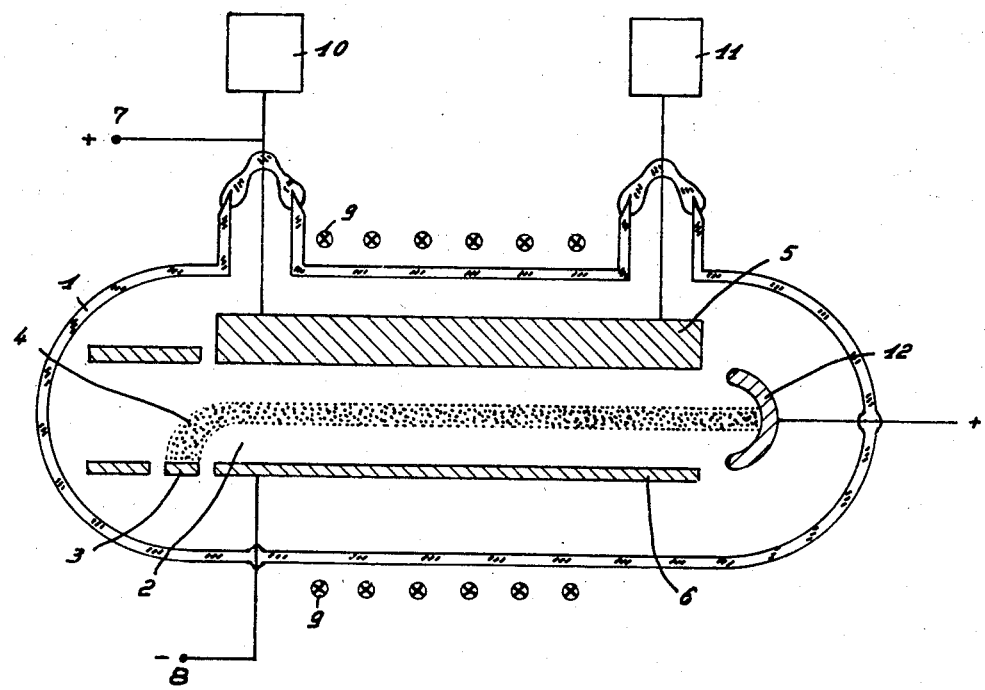
Figure 18 shows in longitudinal section a travelling wave line tube using a line according to the invention.

Tube 1, shown in Figure 18, comprises an interaction space 2 wherein the source 3 injects an electron beam 4. The interaction space is bounded by a delay line 5 and a parallel electrode 6 between which there is established, due to the difference of potential of a supply source connected between the terminals 7 and 8, an electrical field perpendicular to the direction of travel of the beam. A source of magnetic field not shown on the drawings creates a field having lines of force 9 perpendicular to the electric field and to the beam 4. The tube is operating as an amplifier, and to this effect the UHF energy is supplied to the delay line by a source 10 and the amplified energy is collected from line 5 by an utilization device 11. The electrons are collected by a collecting electrode 12 which is raised to a suitable positive potential. The delay line 5 may have any of the forms illustrated in Figures 3 to 16.

What we claim is:

1. A travelling wave tube comprising a delay line, a conducting member having a surface spaced apart from said delay line and defining therewith an interaction space, a source of electrons having means for directing a beam of electrons into said interaction space, collecting means for absorbing said electrons at the outlet of said interaction space, input coupling means for UHF energy to said delay line near said source, and output coupling means for receiving amplified UHF energy from said delay line near said collecting means, said delay line including a pair of comb-like elements having teeth arranged in mutual interdigital relationship and extending parallel to each other, thereby constituting a geometrically periodical structure comprising a chain of identical cells, each composed of two adjacent teeth, each cell comprising an asymmetrical structure of the same kind for all the cells along said line.

2. A travelling wave tube according to claim 1, in which the combs are identical, but displaced with respect to the position in which each tooth of a comb is symmetrically positioned between two teeth of the opposed comb.

3. A travelling wave tube according to claim 2, including teeth located in the same plane, the combs being displaced in the lengthwise direction of the line.

4. A travelling wave tube according to claim 2, including teeth symmetrically positioned with regard to each other longitudinally of the line, the combs being transversely displaced to that the respective teeth are located in two parallel average planes.

5. A travelling wave tube according to claim 2, including combs displaced at the same time lengthwise and crosswise with respect to the symmetry position.

6. A travelling wave tube according to claim 1, in which both combs have at least one of their dimensions respectively different.

7. A travelling wave tube according to claim 6, in which the length of the teeth is unequal in the respective combs.

8. A travelling wave tube according to claim 6, in which the cross section of the respective teeth is unequal.

9. A travelling wave tube according to claim 8, wherein the teeth of one comb are of smaller cross section and are displaced further from said surface than are the teeth of the other comb.

10. A travelling wave tube according to claim 8, in which the combs are transversely displaced so that the respective teeth be located in two different average planes.

11. A travelling wave tube according to claim 8, said combs being displaced at the same time lengthwise and crosswise with respect to the symmetry position.

12. A travelling wave tube according to claim 6 in which the shape of the respective teeth is different.

13. A travelling wave tube according to claim 12, in which the teeth of one of the combs have a gradually decreasing form of section.

14. A travelling wave tube according to claim 12, in which the teeth of one of the combs are folded at right angles and fixed to a support joined at right angles to the support of the second comb.

15. An interdigital delay line in which the fundamental space component of the wave propagated therein is positive and which is adapted to be used in a travelling wave tube in which an electron beam travels in an interaction space along said delay line in energy transfer relationship therewith, consisting of two comb-like elements having teeth arranged in mutual interdigital relationship and extending essentially parallel to each other to constitute a geometrical periodical structure having a chain of identical cells, each composed of two adjacent teeth, and all of said cells having an essentially identical asymmetrical structure along said line.

16. A delay line according to claim 15, wherein said teeth are mutually displaced at least transversely of said line.

17. A delay line according to claim 15, wherein said teeth are of different configuration.

18. A delay line according to claim 15, wherein said teeth are of different length.

19. A delay line according to claim 15, wherein said teeth are mutually displaced at least longitudinally of said line.

References Cited in the file of this patent

UNITED STATES PATENTS

| | | |
|---|---|---|
| 2,565,387 | McCarthy | Aug. 21, 1951 |
| 2,566,087 | Lerbs | Aug. 28, 1951 |
| 2,609,522 | Hull | Sept. 2, 1952 |
| 2,623,121 | Loveridge | Dec. 23, 1952 |
| 2,635,211 | Crawford et al. | Apr. 14, 1953 |
| 2,655,616 | Rollin | Oct. 13, 1953 |
| 2,679,615 | Bowie | May 25, 1954 |
| 2,687,777 | Warnecke et al. | Aug. 31, 1954 |
| 2,688,106 | Bernier | Aug. 31, 1954 |
| 2,735,958 | Brown | Feb. 21, 1956 |

OTHER REFERENCES

Article by Crawford and Hare, pages 361–369, Proc. I.R.E., vol. 35, No. 4, April 1947.